(12) United States Patent
Fleizach et al.

(10) Patent No.: US 10,321,068 B2
(45) Date of Patent: Jun. 11, 2019

(54) IMAGE-BASED AUTO-IRIS

(71) Applicant: SPAWAR Systems Center Pacific, San Diego, CA (US)

(72) Inventors: Gregory K. Fleizach, San Diego, CA (US); Micaela M. Wiseman, Boston, MA (US)

(73) Assignee: The United States of America as Represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/703,837

(22) Filed: Sep. 13, 2017

(65) Prior Publication Data

US 2019/0082087 A1    Mar. 14, 2019

(51) Int. Cl.
| | |
|---|---|
| *G03B 9/07* | (2006.01) |
| *H04N 5/238* | (2006.01) |
| *H04N 5/235* | (2006.01) |
| *H02P 8/42* | (2006.01) |
| *G03B 9/14* | (2006.01) |

(52) U.S. Cl.
CPC .......... *H04N 5/238* (2013.01); *H04N 5/2351* (2013.01); *H04N 5/2352* (2013.01); *G03B 9/14* (2013.01); *H02P 8/42* (2013.01)

(58) Field of Classification Search
CPC ... G03B 7/16; G03B 9/70; G03B 7/12; G03B 9/02; G03B 9/06; G03B 11/00; G03B 5/005; H04N 2101/00; H04N 5/2354; H04N 5/238; H04N 5/2254; H04N 5/2352; H04N 5/2353; H04N 5/2312
USPC .................... 396/67, 505; 348/363
See application file for complete search history.

(56) References Cited

U.S. PATENT DOCUMENTS

| | | | |
|---|---|---|---|
| 4,458,992 A * | 7/1984 | Preston | G03B 7/085 352/141 |
| 5,079,622 A | 1/1992 | Toshinobu | |
| 5,315,394 A | 5/1994 | Kurashige | |
| 5,331,422 A * | 7/1994 | Nishida | H04N 5/2351 348/363 |
| 6,862,106 B1 * | 3/2005 | Matsushima | H04N 1/2112 348/231.1 |

(Continued)

FOREIGN PATENT DOCUMENTS

| | | |
|---|---|---|
| CN | 102135700 | 6/2013 |
| CN | 102572287 | 10/2014 |

*Primary Examiner* — Walter L Lindsay, Jr.
*Assistant Examiner* — Warren K Fenwick
(74) *Attorney, Agent, or Firm* — Naval Information Warfare Center, Pacific; Kyle Eppele; Susanna J. Torke

(57) ABSTRACT

A method and system for automatically adjusting an iris opening in an imaging system. The method includes an iterative process that continues to adjust the camera's iris opening until an algorithm stopping condition is met. More particularly, a processor determines a brightness for the image at the current aperture setting. The processor classifies the image according to one of at least two brightness regime classifications. Based on the classifying step, the processor selects a pre-set optimal brightness parameter. The processor compares the brightness value of the image to the pre-set optimal value. The camera's iris opening is automatically adjusted based on a formula that takes into account, the current f-stop setting, the current brightness value, and the optimal brightness value. The iterative process continues until an algorithm stopping condition is met.

13 Claims, 7 Drawing Sheets

(56) References Cited

U.S. PATENT DOCUMENTS

| | | | |
|---|---|---|---|
| 6,922,030 B2 | 7/2005 | Chou | |
| 6,980,251 B1* | 12/2005 | Tamura | H04N 5/2351 |
| | | | 348/224.1 |
| 8,150,202 B2* | 4/2012 | Mohanty | G06T 5/40 |
| | | | 358/3.26 |
| 9,866,763 B2* | 1/2018 | Huang | H04N 5/238 |
| 9,921,455 B2* | 3/2018 | Kuwakino | G03B 7/20 |
| 2003/0164893 A1* | 9/2003 | Mayhew | H04N 5/232 |
| | | | 348/368 |
| 2007/0024741 A1* | 2/2007 | Moriya | H04N 5/2352 |
| | | | 348/363 |
| 2014/0119602 A1* | 5/2014 | Zuo | G06T 7/2033 |
| | | | 382/103 |
| 2016/0119603 A1* | 4/2016 | Hayashi | G06T 5/003 |
| | | | 348/222.1 |

* cited by examiner

IMAGE-BASED AUTO-IRIS

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103,252.

BACKGROUND OF THE INVENTION

Field of Invention

This disclosure relates to imaging systems, and more particularly, to apertures for imaging systems.

Description of Related Art

Imaging systems may have two means of controlling the exposure. One means may be the exposure time or shutter speed. The exposure time controls how long the imaging element—e.g., a photosensor in the case of digital cameras, and film in the case of analog cameras—is exposed to a scene.

Another means for controlling exposure is the aperture or iris setting, also known as an f-stop. The aperture controls the size of the opening through which the light from the scene can travel. A larger aperture permits more light to pass therethrough.

Many imaging systems allow the two controls to be manipulated separately for a range of effects since the exposure time and aperture are not wholly independent. That is, a longer exposure time also allows more light to reach the imaging element. Therefore, two scenes can have the same amount of light per unit area (exposure), which is a combination of the exposure time and the aperture, but look very different. This is because the exposure time also affects the motion blur of the image and the aperture also affects the depth of field of the image.

However, some imaging systems have a fixed exposure time due to device limitations. Thus, the only parameter to control exposure is the aperture. Closing the aperture too much may produce an overly dark image, but opening the iris too much can produce an overly bright image that is washed out. For each scene, there is an optimal aperture along with a range of acceptable apertures for which the scene is viewable and no information is lost.

Prior methods to determine the optimal iris setting include manual adjustment where the user is required to change the aperture until an acceptable image is obtained. The obvious drawback is that the user must change the aperture any time the scene illumination changes. Since the iris may be a mechanical system, the response time can be slow, which means manual iris adjustment can be a painstaking process.

Another prior method is to use a photosensor (i.e., light intensity sensor) separate from the camera to measure the light and adjust the iris based on this measurement. A problem with this approach is that the photosensor rarely has the same directionality as the camera. For example, if the camera is pointed at a dark corner of a room, the photosensor may be detecting light from the entire room. More importantly, however, is that in this approach there is no feedback in this auto-iris loop; the photosensor is used to change the aperture, but there is no way to tell if the image has improved.

Other prior methods calculate a brightness measure from the captured image. The technique to choose the pixels in the image for the calculation is called metering. For example, spot metering means using a small area to measure the brightness, typically in the center of the image. It is typical to calculate the brightness in several different regions in the image. The brightness measure is then compared to a reference brightness, while taking into account the current aperture and exposure time. The apparent simplicity in this scheme belies the staggering number of both metering possibilities (with complex weighting schemes for the different regions) and reference brightness values, which are often in the thousands.

Further, many of these proprietary metering approaches must be finely calibrated and require all of the preset brightness metering values to be stored in the device. These types of methods and others often rely on complex equations with many variables to determine the desired aperture setting.

Accordingly, there is a need for an automatic means for controlling the exposure via the aperture. There is further a need for such a means to be simple and fast.

BRIEF SUMMARY OF INVENTION

The present disclosure addresses the needs noted above by providing a method and system for automatically adjusting an iris opening of an imaging system. In accordance with one embodiment of the present disclosure, the method comprises: (a) providing an imaging system having an iris opening; (b) receiving, at a memory, an image from the imaging system; (c) determining, by a processor, a current brightness value for the image at a current f-stop setting; (d) classifying, by the processor, the image according to one of at least two brightness regimes, including by comparing the current brightness value to one or more brightness threshold values; (e) based on the classifying step, selecting, by the processor, a pre-set optimal brightness value; (f) calculating, by the processor, a next f-stop setting based on the current f-stop setting, the current brightness value, and the optimal brightness value; (g) automatically adjusting, by an iris adjustment device, the imaging system's iris opening based on the calculated next f-stop setting; and (h) repeating steps b to g until an algorithm stopping condition is met.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the image-based auto iris. In the drawings.

DETAILED DESCRIPTION OF THE INVENTION

The general purpose of the method and system described herein is to automatically determine the optimal iris setting (i.e., aperture) for an imaging system (video or still) with a fixed exposure time using the captured images, and to automatically adjust the imaging system's iris setting to the determined optimal iris setting. The invention is a simple method for iteratively analyzing the image output from a digital camera to automate the adjustment of the camera's iris opening to the correct setting. This algorithm may be used in a number of situations, including situations in which the imaging system has a fixed exposure time and rapidly changing light, which makes it difficult for an operator to manually adjust the iris.

In accordance with the proposed method and system, the image itself may be used to determine the brightness. In this connection, the image may be classified as either bright or dark to choose the reference brightness. Based on the classification as bright or dark, a pre-set optimal brightness value may be selected. Then, a next iris/aperture setting may be calculated based on three components: the current aperture setting, the current brightness value, and the optimal brightness value. The iris setting may be automatically adjusted based on the calculated next iris/aperture setting. These steps are repeated until an optimal iris/aperture setting is reached.

In the approach described herein, the image may be repeatedly updated with adjusted iris settings. Thus, the method described herein may be used to iteratively improve the iris setting until the method converges to the optimal setting. This allows for a gradual adjustment of the aperture, which may be more visually appealing and less likely to overshoot the correct setting. The proposed method does not require any user input to select the spot metering region or start the auto-iris. It can run completely autonomously without user intervention.

The proposed system and method may converge to an optimal iris setting for a fixed scene in a small number of iterations, which could only take a fraction of a second, assuming a typical frame rate of thirty (30) frames per second (fps), and depending on the speed of aperture movement. The proposed system and method may be particularly helpful for industrial and military applications in which the object of interest is centered in the frame.

Figure 1:
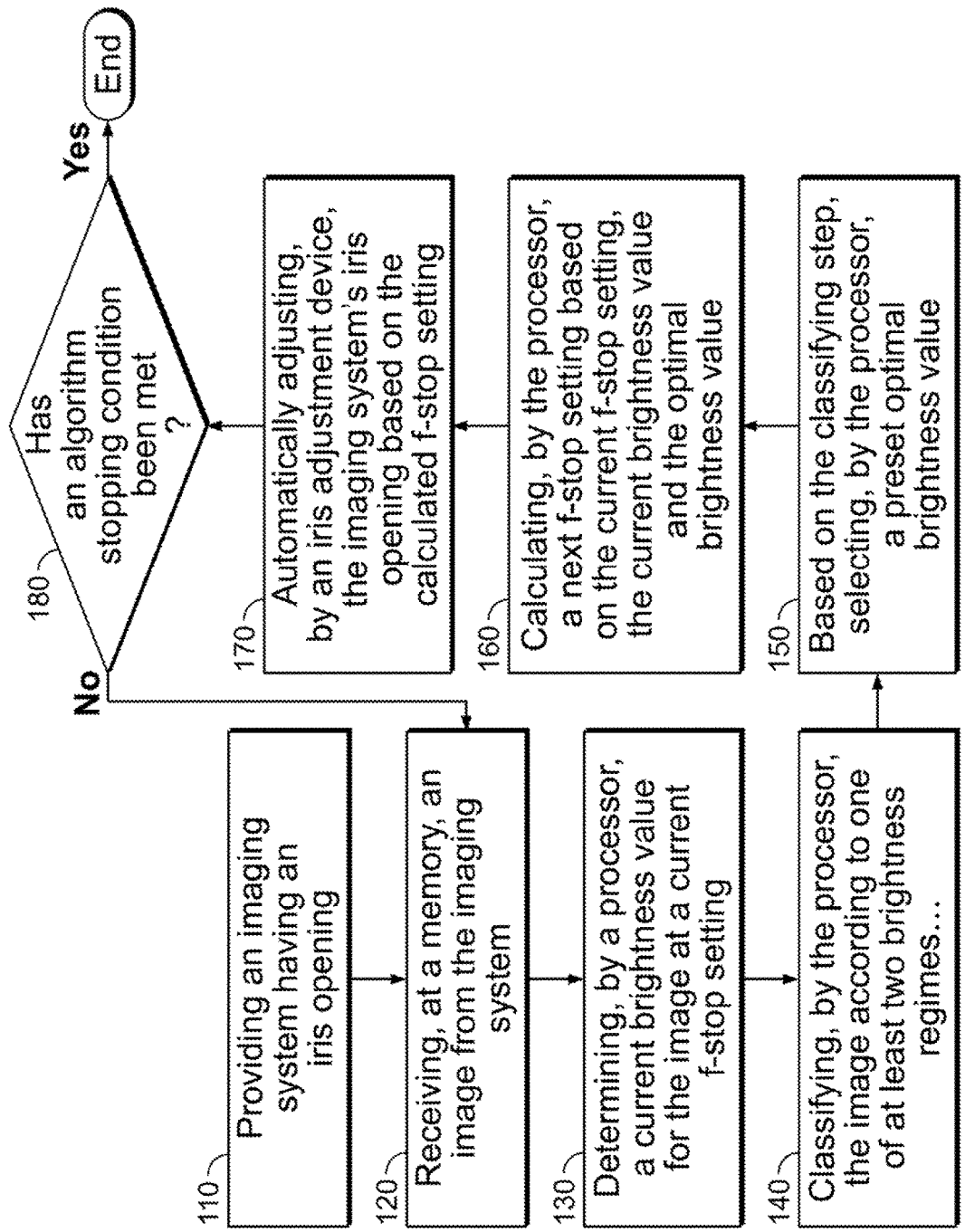
FIG. 1 is a flow chart of a method for automatically adjusting an iris in an imaging system, in accordance with one embodiment of the present disclosure.

FIG. 1 illustrates an example of a method for automatically adjusting an iris opening in accordance with one aspect of the present disclosure. At step 110, the method includes providing an imaging system having an iris opening. The imaging system may be a color or monochrome imaging system, including a digital camera. The imaging system has an iris opening.

Then, at step 120, the method includes receiving, at a memory, an image from the imaging system. This memory must be sufficient to hold at least the imaging system's images that are used for the iterative process. In connection with determining a brightness threshold, photos of a large selection of different scenes with different amounts of light may be taken by the imaging system, a priori. For imaging systems used to capture images of specific scenes or in specific settings, it may be desirable to capture images of those scenes or specific settings and use the resulting images to determine a brightness threshold.

At step 130, the method includes determining, by a processor, a current brightness value for the image at a current f-stop setting. A number of different methods can be used to determine the brightness. One way to determine the brightness is by calculating the average pixel value on the current image. From the image generated by a digital camera, the average value of all of its pixels may be calculated, thus determining the brightness of the image. This average value for the aperture setting that the camera is currently using may be compared to a threshold value to determine if the scene the camera is pointing toward is bright or not. This classification may be used to find the correct parameters for the f-stop update calculation.

To create the threshold to determine if an image is bright or not, photos of a large selection of different scenes with different amounts of light may be taken. For imaging systems used to capture images of specific scenes or in specific settings, it may be desirable to include in that memory, images taken of those specific scenes or settings. For example, if the imaging system is designed for use in a factory setting, e.g., to scan factory parts, it may be useful to take images in a factory setting to use as a basis for determining the brightness threshold. If the imaging system is used as an indoor camera, it may be useful to determine the brightness threshold in an indoor setting.

If the camera is a general purpose camera, it may be useful to take images in a variety of environments, e.g., the beach, indoors, in the mountains, etc. It may also be helpful to collect these images in situ such that the algorithm may be better calibrated for the camera's specific uses. By way of example, approximately ten (10) scenes may be taken for each expected light setting (e.g., low light, medium light, bright light) for the camera's intended use. Also by way of example, one (1) photo may be taken of each scene at each aperture setting, say, from 1.0 to 500.0.

Graphing the f-stop versus the average value of all of the pixels in the image (i.e., estimate of brightness) for each scene, there may be a clear-cut divide between scenes that can subjectively be classified on the one hand as "bright" for the camera's specific application, and those that can be classified on the other hand as "not-bright" or "dark." The not-bright scene that fell closest to the divide should be used as the "threshold scene," and the average pixel value of that image at a particular f-stop is the brightness threshold, bright_thresh, for that f-stop. For example, from experimental data of a twelve-bit (12-bit) camera used to calibrate the thresholds for a specific camera, at an f-stop of 7, images with an average pixel brightness of less than 692.3 may be classified as not-bright. Images greater than 692.3 may be classified as bright. At f-stop 4.5, the threshold to classify pictures may have an average pixel brightness of 1512.3. At f-stop 3.2, the threshold may become 2727.4. These are static values that only need to be determined once a priori before the algorithm runs in real-time.

Other ways of determining brightness include taking the median brightness based on the pixel values or any other means deemed suitable, as can be appreciated by one of ordinary skill in the art. The resulting brightness value may be compared to the pre-set optimal value through an equation to generate the updated iris setting. The updated iris setting may not be possible in the camera because f-stop iris settings are discrete values so the result is rounded. As is known in the art, an f-stop is the ratio of the system's focal length to the diameter of the entrance pupil. Typical f-stop settings may include f/1.4, f/2.2, f/3.5, f/4.5, f/5.6, f/8.0, etc.

At step 140, the method includes classifying, by the processor, the image according to one of at least two brightness regimes. The regimes may include bright and not-bright/dark. For every image, while the auto-iris algorithm is running, the average pixel value of the entire image may be calculated and compared to the average pixel value of the threshold scene, bright_thresh, at the camera's current f-stop. Calculating the average pixel value of the entire image entails summing the intensity values of each pixel in the image and then dividing the sum by the total number of pixels. In lieu of calculating the average pixel value of the entire image, the average pixel value could be determined for only a portion of the image, e.g., by calculating the average pixel value of the pixels in the center of the image. In this manner, the system may determine if the image is bright or not-bright. If the average pixel value is above bright_thresh, then the current image may be classified as bright. Otherwise, it may be classified as not-bright or dark.

Based on this simple classification step, at step 150, the method may include selecting, by the processor, a pre-set optimal brightness value based on various pre-set brightness parameters. For each classification (bright or not-bright/dark), there may be an optimal value of what the average pixel value should be, which can be found heuristically. That is, for an image classified as bright, the target (optimal) brightness may be $B_{opt,bright}$. For a non-bright image, the optimal brightness may be $B_{opt,non-bright}$. These values may be independent of the current f-stop value/setting. The optimal brightness for bright and not-bright images can be found by visually analyzing the images collected for a variety of scenes at each f-stop. The optimal f-stop for each scene can be selected subjectively and may be within a range of f-stops where the image is neither so dark so the contents are obscured, nor so bright such that blooming washes out the contents. Example values of $B_{opt,bright}$ and $B_{opt,non-bright}$ that have been used with success are 1000 and 788, respectively, for 12-bit images. To calculate $B_{opt,right}$, for example, the brightness values of the optimal images (chosen as those at which the f-stop setting produces the best image) for each scene classified as bright may be averaged together.

At step 160, the processor calculates a next f-stop setting based on the current f-stop setting ($F_{current}$), the current brightness value ($B_{current}$) and the optimal brightness value ($B_{opt}$). As an example, the following formula may be used:

$$F_{next} = F_{current} \cdot \sqrt{\frac{B_{current}}{B_{opt}}} \qquad \text{(Equation 1)}$$

At step 170, the method includes automatically adjusting, by an iris adjustment device, the imaging system's iris opening based on the calculated f-stop setting. Physical items can also be added to aid in adjusting the iris opening. These items can include a motor, an actuator or a series of magnets, as can be appreciated by one of ordinary skill in the art. The physical items may also operate in conjunction with software to accomplish adjustment of the iris opening.

At step 180, the method includes determining whether an algorithm stopping condition has been met. If so, the method concludes and no more iris adjustment occurs. If no algorithm stopping condition has been met, the iterative process at steps 120 to 170 continues until an algorithm stopping condition is met, e.g., when the calculated f-stop setting ($f_{next}$) is substantially the same as the current f-stop setting. When the calculated f-stop value is equal to the current f-stop value, a local convergence check may be run to make sure the f-stop value is a global convergence point. A global convergence point may represent the best solution across the range of possible f-stops, but a local convergence point may be an f-stop that is not optimal. The iteration process runs continuously and may quickly converge to an optimal iris setting. A nonconvergence check may also be run to check whether the method does not converge, and if so, to continue running the algorithm, since convergence gives the optimal iris setting. It should be appreciated that the steps and order of steps described and illustrated are provided as examples. Fewer, additional, or alternative steps may also be involved in the process for automatically adjusting an iris opening and/or some steps may occur in a different order.

Figure 2:
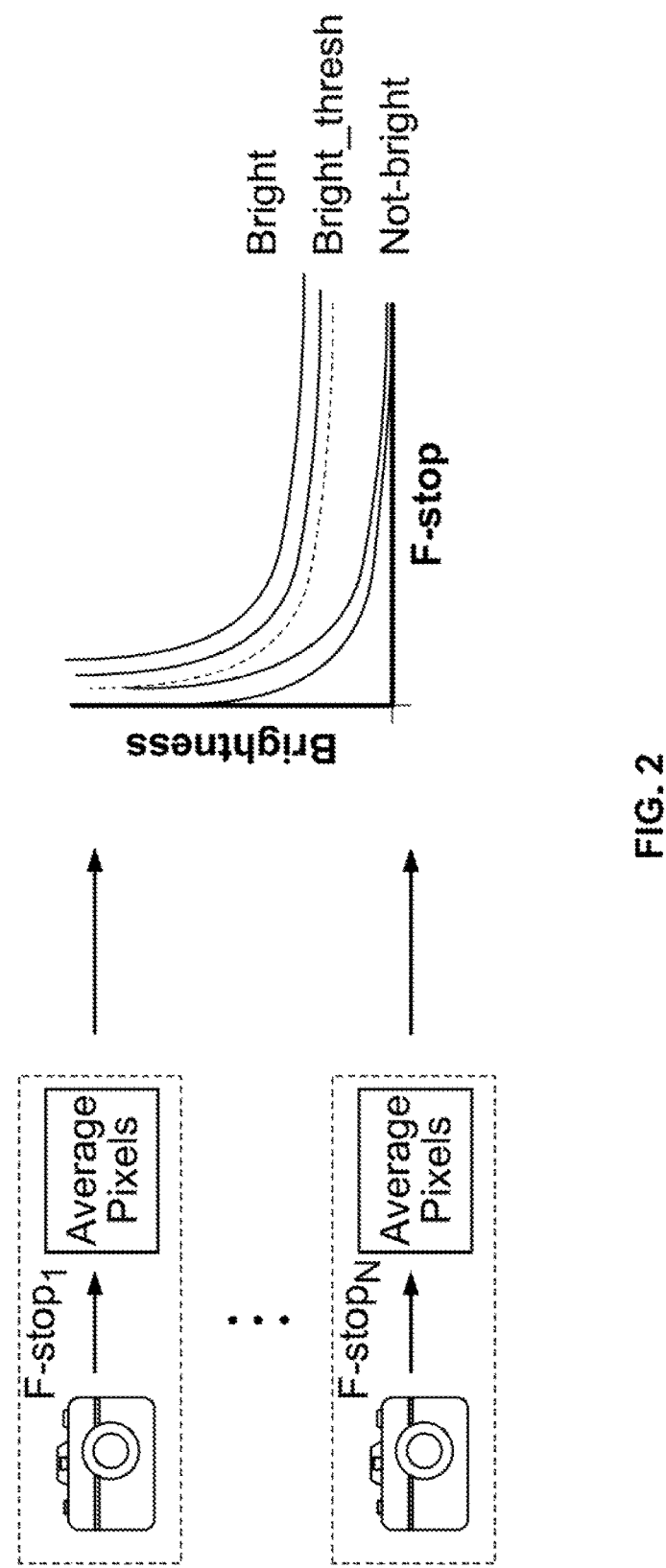
FIG. 2 is a diagram showing a brightness threshold calculation in accordance with one embodiment of the present disclosure.

FIG. 2 illustrates a block diagram of the brightness threshold determination process with an illustration of example output. To obtain the data for FIG. 2, a set of images was taken of different scenes, one image per f-stop per scene, and pixel brightness was averaged for each image. Each curve on the graph in FIG. 2 represents the brightness versus f-stop for a certain scene. The brightness threshold is shown as a dashed line in FIG. 2.

Figure 3:
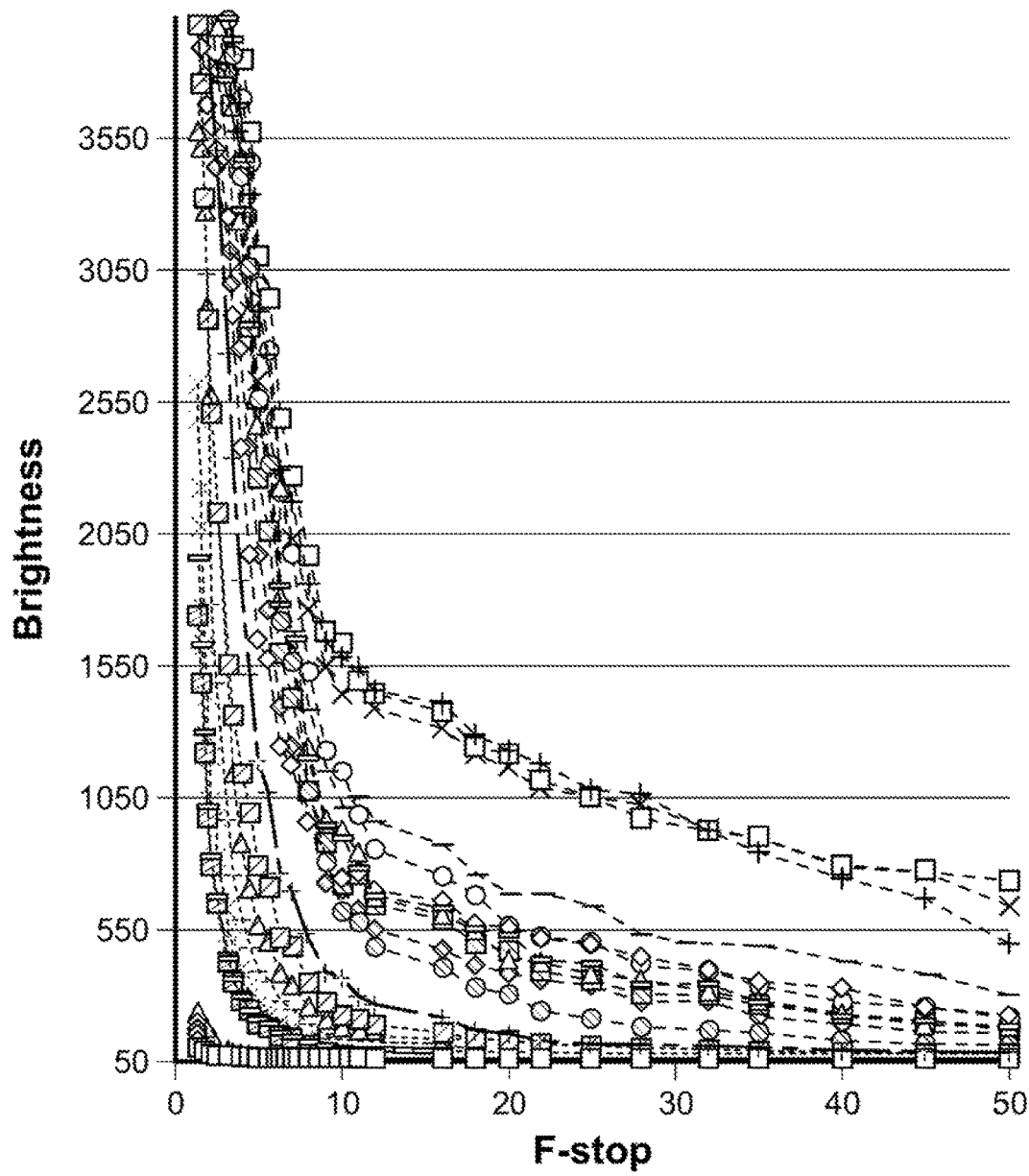
FIG. 3 is a sample brightness versus f-stop graph in accordance with one embodiment of the present disclosure.

Referring now to FIG. 3, a sample brightness versus f-stop graph is shown. The curves in the not-bright region are shown in dotted lines and the curves in the bright region are shown in dashed line. The middle dotted and dashed curve is the brightness threshold curve, bright_thresh. In this example, the camera is 12 bit, so the maximum average brightness value is 4095.

FIG. 3 includes a number of data points, numbering in the hundreds. The more data that is fed to determine the brightness threshold, the more accurate the results may be. Using three values, i.e., the current average pixel value, the optimal average pixel value ($B_{opt,bright}$ or $B_{opt,non-bright}$, depending on the image classification), and the current f-stop, the next f-stop to which the camera aperture should be adjusted can be calculated. Equation 1, is used to calculate the next f-stop based on current measurements:

$$F_{next} = F_{current} \cdot \sqrt{\frac{B_{current}}{B_{opt}}} \qquad \text{(Equation 1)}$$

where $F_{next}$ is the desired f-stop setting, $F_{current}$ is the current f-stop setting at which the current image was captured, $B_{current}$ is the current brightness value (i.e., average pixel value in the image), and $B_{opt}$ is the optimum brightness value (i.e., either $B_{opt,bright}$ or $B_{opt,non-bright}$). In lieu of Equation No. 1 above, other equations could be used to find $F_{next}$, as can be appreciated by one of ordinary skill in the art.

When an image's average pixel value comes close to the optimal value, the camera's current aperture setting is estimated as the optimal aperture setting for that scene. Otherwise, the aperture must be adjusted by opening it to let more light into the image or closing it to let less light into the image. The next f-stop $F_{next}$ is not necessarily the optimal f-stop yet. It is simply the next f-stop to which the imaging system should be adjusted in order to perform the calculation again and find the next aperture to improve the image.

The present algorithm-based method is iterative, and it will quickly converge on the optimal aperture setting, typically within several iterations. When the algorithm determines that the $F_{next}$ is actually $F_{current}$, and the local convergence check described below is passed, the optimal setting has been reached.

Figure 4:
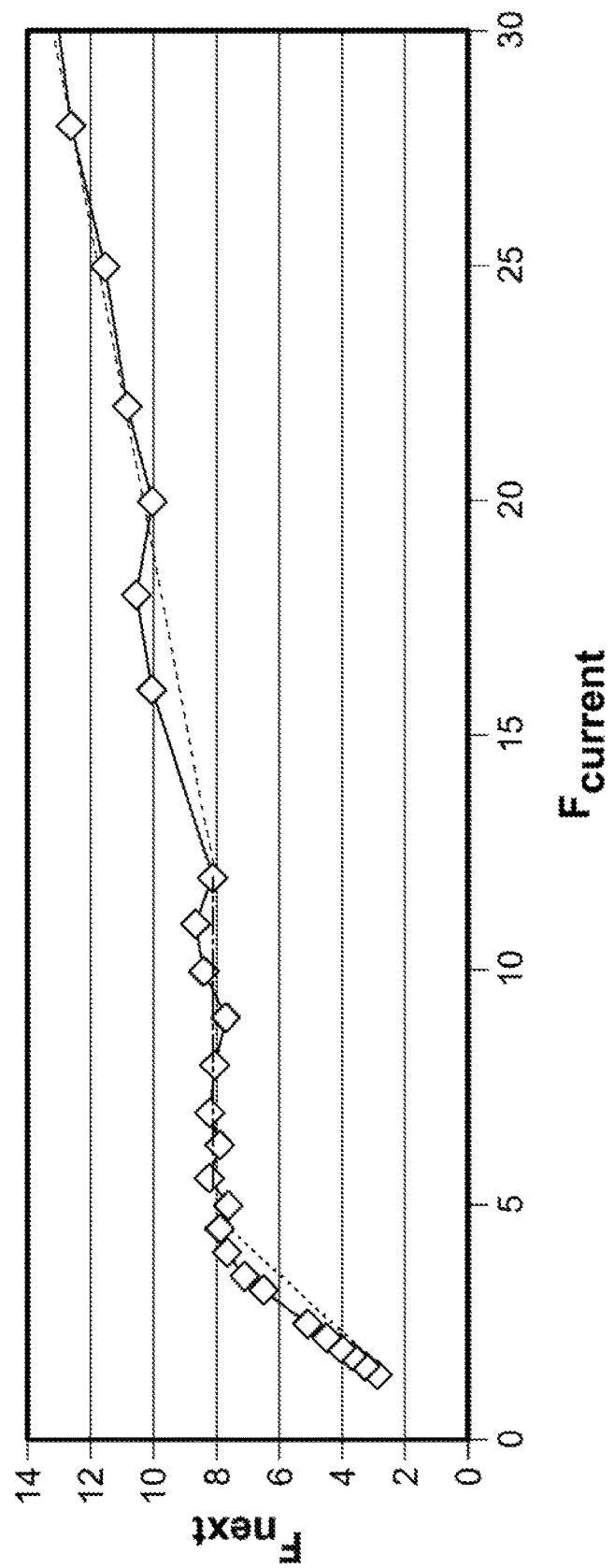
FIG. 4 is a typical convergence region, in accordance with one embodiment of the present disclosure.

FIG. 4 illustrates an example output from Equation No. 1 above. Three regions are highlighted with different legends. The first region on the left (dotted line) is where the image is too bright and the aperture needs to be closed. Note that the slope is greater than one, so a given $F_{current}$ produces a larger $F_{next}$, which means a smaller aperture and less light. On the right side of the graph is the dark region (dashed line) where the aperture needs to be opened to let more light in. Here, the slope of the line is less than one, which means a given $F_{current}$ produces a smaller $F_{next}$. In the center there is a wide region where the apertures converge (dotted and dashed line) to the optimal f-stop, 8.0 in this example. Any time the camera's $F_{current}$ falls in the dotted and dashed region, its output $F_{next}$ will be the steady state aperture value of 8.0. Starting at an $F_{current}$ on the left side of the graph, the f-stops will be pushed right up the curve until hitting the dotted and dashed region and converging. Starting at an $F_{current}$ on the right, the f-stops may be pushed left down the curve until hitting the dotted and dashed region and converging.

The output $F_{next}$ will be rounded to the discrete f-stop to which it is closest. In that round, if $F_{next}=F_{current}$, the convergence region may have been reached, and a local convergence check may need to occur. The local convergence check prevents the auto-iris algorithm from stopping at a local convergence point. Instead of having an algorithm stopping condition be met by simply stopping the iterations when the current f-stop equals the next predicted f-stop, the aperture may be pushed one f-stop further in the direction of the trend of the previous f-stops. The algorithm checks the next f-stop in the direction of the changing aperture (i.e., next lower f-stop if dF/dt<0, next higher f-stop if dF/dt>0) to see if it would continue in the same direction. If it does, the method may find the $F_{next}$ consistent with the direction of the changing aperture. This would indicate the iris was at a local convergence point on the previous iteration instead of the true optimum value. When the iris does reach a point when pushing one f-stop further in the direction of the trend pushes $F_{next}$ back again in the opposite direction, a true convergence point has been reached.

For example, assume the system starts at f-stop 22.0 and proceeds to f-stop 16.0. At 16.0, $F_{next}$ is calculated to be 16.0, which makes it appear that the algorithm has found the optimal iris setting, but this could turn out to be a local convergence point. Checking one f-stop lower to 12.0 would give an $F_{next}$ of 9.0. The lower f-stop was checked because decreasing f-stops was the trend in this example. From f-stop 9.0, $F_{next}$ would again point to 9.0. Trying the local convergence check again for f-stop 8.0 (one below f-stop 9.0), $F_{next}$ is found to be 9.0. The consistency that both f-stops greater than 9.0 (i.e. 12.0) and lower than 9.0 (i.e. 8.0) point to the same value is evidence of a true optimum convergence point instead of a local convergence point.

FIG. 4 illustrates a typical convergence region, which may be quite wide. Thus, if a true convergence point has been reached, the next f-stop (either greater or less than the current f-stop) should also return the true convergence point. Otherwise, if the following iteration generates an $F_{next}$ in the same direction as the aperture trend, then the updates may continue until a true convergence point, instead of a local convergence point, is reached. A check is also included in the algorithm to make sure that the update loop does not "ring," or loop back and forth between f-stops and never converge. This process may be termed a nonconvergence check. Nonconvergence may be undesirable as it may cause a constant brightening and darkening of even a static scene. To control this ringing, the algorithm keeps track of the previous f-stop. If $F_{next}$ comes out to equal $F_{previous}$, there may be a clear problem. If $F_{next}$ is greater than $F_{current}$, then the algorithm may stop because an algorithm stopping condition ($F_{next}$ is greater than $F_{current}$) has been met. The greater-than check may be done so that, in the case of switching back and forth between two f-stops, the brighter one will be chosen, based on the observation that the slightly brighter picture is usually better in these cases. FIG. 4 shows how the algorithm transitions from one f-stop to the next. It should be noted that many sensors have standard f-stops.

Figure 5A:
FIGS. 5A-5E show the progression of the algorithm through several f-stops from an aperture that is too large (f-stop 1.4) to the desired aperture (f-stop 5.6) where the algorithm converges in accordance with one embodiment of the present disclosure.
Figure 5B:
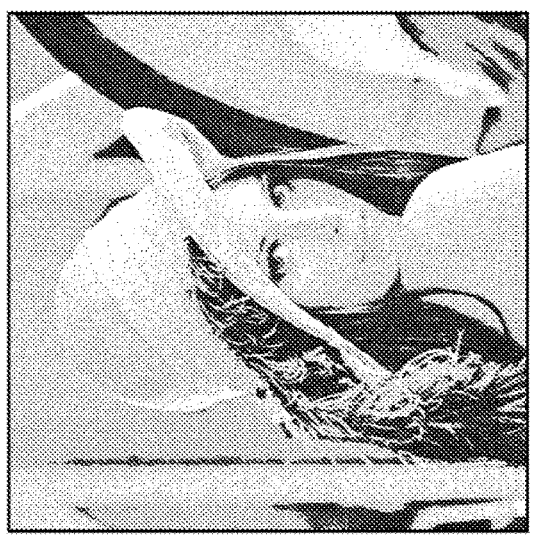
Figure 5C:
Figure 5E:
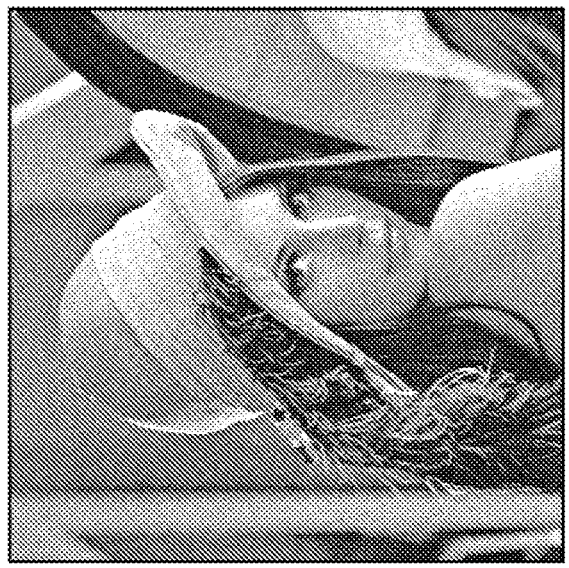
Figure 5D:
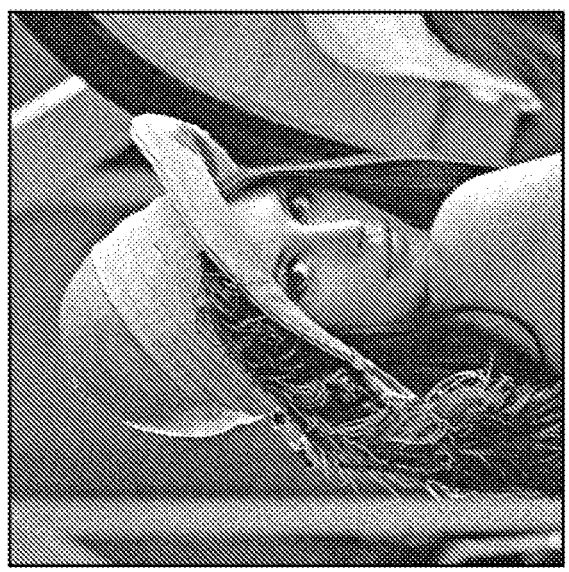

Some simulated image examples, illustrated in FIGS. 5A-5E, show how the automatic adjustment method described herein results in an improved image. Referring now to FIGS. 5A through 5E together, they show the progression of the method through several f-stops from an aperture that is too large (f-stop 1.4) to the desired aperture (f-stop 5.6) where the algorithm converges. FIG. 5A shows the initial scene at f-stop 1.4. FIG. 5B shows the iris adjustment in progress at f-stop 2.2. FIG. 5C shows the iris adjustment at f-stop 3.5. The image gets increasingly clearer as each adjustment is made. For the naked eye of many people, anything from 3.5 up may be clear enough. FIG. 5D shows the iris adjustment at f-stop 4.5. FIG. 5E shows the optimal adjustment at f-stop 5.6. The adjustment may stop thereafter.

The reference brightness values for the bright and not bright scenarios may be different for different applications (e.g., different for an assembly line in a factory than for a camera on an outdoor unmanned aerial vehicle). The reference brightness levels may be generated heuristically or theoretically. More than two brightness regimes can be classified instead of just the two use hereinabove, which are bright and not bright. Additional brightness regimes may allow the aperture to be tuned more finely, but at the expense of a more complicated system. The brightness threshold may be from a brightness curve over f-stop from an actual image or it may be an equation fit from the data.

Other equations to calculate the optimum aperture setting may be used instead of the equation outlined herein. It may also be possible to use the proposed method to control the exposure time of the image for a fixed aperture instead of the fixed exposure time/variable iris method explained above. A possible application might be a pinhole camera. There are many alternative methods to choosing and calculating the spot for the brightness calculation. For example, the entire image may be chosen for simplicity, but a smaller square, rectangular, circle, oval, etc. region could be used instead so that brightness was determined based on a portion of the image. The proposed method may use the mean pixel value to calculate the brightness, but it is also possible to use any other number of metrics, such as the median. The brightness metric can be computed on the raw image or an enhanced version of the image (e.g., contrast enhanced). If the latter is the default view for the operator, then it may make sense to calculate the brightness based on the enhanced image.

The auto-iris adjustment method described herein can be implemented on color or monochrome imaging systems. For color cameras, a conversion is required from the color space to intensity space. This conversion can be done with simply an average across the color channels or a more complicated method. A simpler stopping algorithm, instead of the local convergence check, could be used to just stop when the changing aperture trend is violated.

Figure 6A:
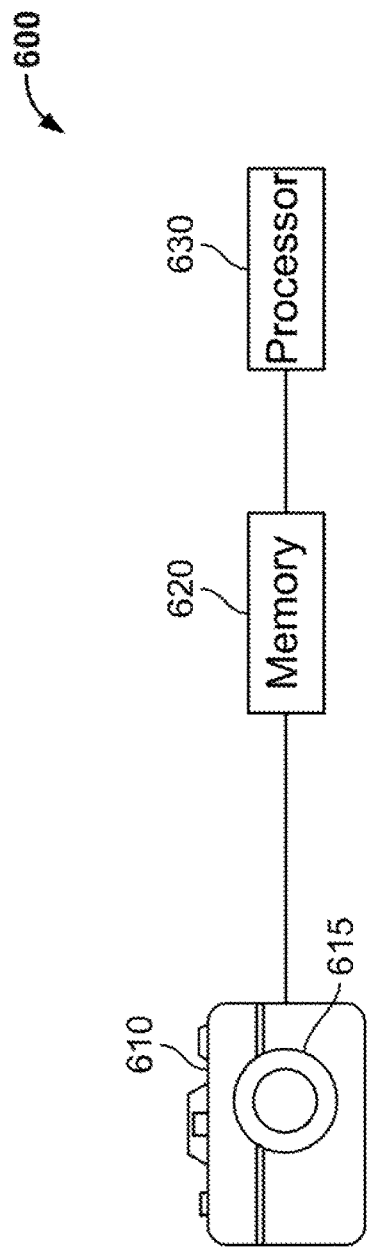
FIG. 6A is a system for automatically adjusting an iris opening, in accordance with one embodiment of the present disclosure.

A system that automatically adjusts the iris opening in accordance with the method described above may incorporate various elements described herein. For example, referring now to FIG. 6A, the system 600 may include an imaging system 610 (and a viewing subsystem 615 incorporated into the imaging system 610), a memory 620 that is operably coupled to the imaging system and a processor 630 that is operably coupled to the imaging system. Software (not shown in FIG. 6A) may be resident in the memory 620, which may cause the processor 630 to perform one or more steps of the method for automatically adjusting an iris opening as set forth herein. If mechanical/electrical devices (whether existing as part of the imaging system or added thereafter) are used to further aid in automatically adjusting the iris opening, such devices may be located within the body of imaging system 610.

Memory 620, as noted hereinabove, is sufficient to hold at least the images of imaging system 610 that are used for the iterative process. In addition, it may be desirable for the memory to be sufficient to aid in determining a brightness threshold. In connection with determining a brightness threshold, photos of a large selection of different scenes with different amounts of light may be taken by an imaging system. For imaging systems used to capture images of specific scenes or in specific settings, it may be desirable to capture images of those scenes or specific settings and use these images in determining a brightness threshold.

The speed of the processor 630 needed depends on the application in which the processor 630 is used. For example, in one application where the image is changing quickly, e.g., with a moving car or boat, a faster processor 630 may be needed. On the other hand, if the invention is used in an assembly line, perhaps the processor 630 need not be as fast.

Figure 6B:
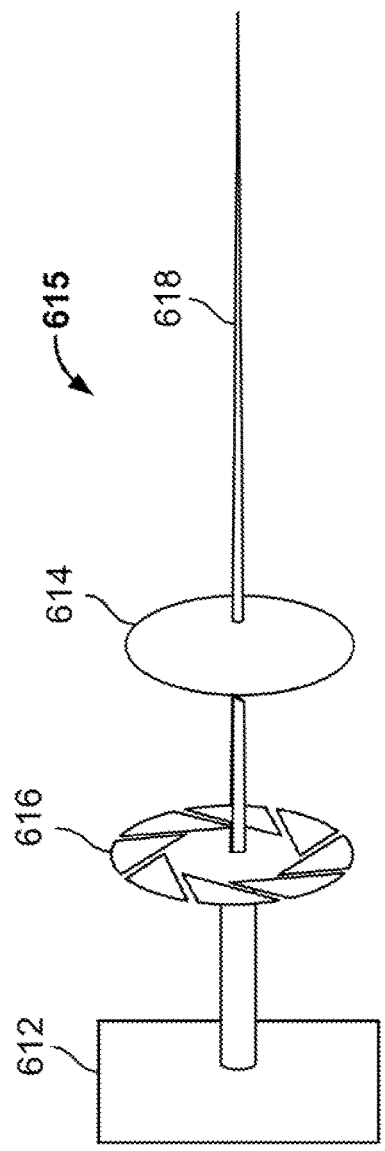
FIG. 6B shows the viewing subsystem of a system for automatically adjusting an iris opening in accordance with one embodiment of the present disclosure.

Referring now to FIG. 6B, the viewing system 615 includes a sensor 612, a lens 614, and an aperture 616, through which light may pass onto a subject (not shown in FIG. 6B). Sensor 612 may be one of a variety of different sensors, including but not limited to, a complementary metal-oxide-semiconductor (CMOS) sensor, a charge coupled device (CCD) sensor, an infrared sensor, a panchromatic sensor, etc. Lens 614 may be any lens supplied with the imaging system. The aperture 616 is the iris opening of the imaging system. Such features are known in the art. Light 618 may pass through each of sensor 612, lens 614 and aperture 616.

The present system and method can be used in a variety of applications to automatically adjust the iris opening. For example, the system and method could be used with consumer car cameras, scientific sensors that do not include automatically adjustable irises. The present system and method can be used as aftermarket corrections of an existing imaging system. Other uses can be determined by one of ordinary skill in the art.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the Unites States is:

1. A method for automatically adjusting an iris opening of an imaging system, comprising:
    providing an imaging system having an iris opening;
    receiving, at a memory, an image from the imaging system;
    determining, by a processor, a current brightness value for the image at a current f-stop setting;
    classifying, by the processor, the image according to one of at least two brightness regimes, including by comparing the current brightness value to one or more brightness threshold values;
    based on the classifying step, selecting, by the processor, a pre-set optimal brightness value;
    calculating, by the processor, a next f-stop setting based on the current f-stop setting, the current brightness value, and the optimal brightness value;
    automatically adjusting, by an iris adjustment device, the imaging system's iris opening based on the calculated next f-stop setting; and
    repeating steps from receiving the image at a memory through adjusting the iris until an algorithm stopping condition is met, wherein the algorithm stopping condition includes a local convergence check.

2. The method of claim 1, further comprising:
    before the repeating step, performing a nonconvergence check.

3. The method of claim 1, wherein one of the at least two brightness regimes is above the brightness threshold value, and another of the at least two brightness regimes is below the brightness threshold value.

4. The method of claim 1, wherein the algorithm stopping condition is met when the calculated next f-stop setting is substantially equal to the current f-stop setting.

5. The method of claim 1, wherein the step of calculating the next f-stop is performed according to Equation 1:

$$F_{next} = F_{current} \cdot \sqrt{\frac{B_{current}}{B_{opt}}}$$

wherein $F_{next}$ is the next f-stop setting, $F_{current}$ is the current f-stop setting at which the current image was captured, $B_{current}$ is the current brightness value in the image and $B_{opt}$ is the optimal brightness value.

6. A system for automatically adjusting an iris opening, comprising:
    a memory configured to receive an image from an imaging system having an iris opening;
    a processor configured to:
        determine a current brightness value for the image at a current f-stop setting;
        classify the image according to one of at least two brightness regimes;
        select a pre-set optimal brightness value based on the classified brightness regime;
        calculate a next f-stop setting based on the current f-stop setting, the current brightness value, and the optimal brightness value;
        repeat steps from receiving the image at a memory through adjusting the iris until an algorithm stopping condition is met, wherein the algorithm stopping condition includes a local convergence check; and an iris adjustment device configured to adjust the iris opening of the imaging system until the algorithm stopping condition is met.

7. The system of claim 6, wherein the processor is further configured to perform a nonconvergence check.

8. The system of claim 6, wherein one of the at least two brightness regimes is above the brightness threshold value, and another of the at least two brightness regimes is below the brightness threshold value.

9. The system of claim 6, wherein the processor is configured to calculate the next f-stop according to Equation 1:

$$F_{next} = F_{current} \cdot \sqrt{\frac{B_{current}}{B_{opt}}}$$

wherein $F_{next}$ is the next f-stop setting, $F_{current}$ is the current f-stop setting at which the image was captured, $B_{current}$ is the current brightness value in the image and $B_{opt}$ is the optimal brightness value.

10. The system of claim 6, wherein the algorithm stopping condition is met when the calculated next f-stop setting is substantially equal to the current f-stop setting.

11. A method for automatically adjusting an iris opening of an imaging system, comprising:

providing an imaging system having an iris opening;

receiving, at a memory, an image from the imaging system;

calculating, by a processor, an average value of pixels in the image, thus determining a brightness for the image at a current f-stop setting;

based on the calculated average value, classifying, by the processor, the image according to one of at least two brightness regime classifications, including the steps of classifying the image as bright if the average pixel value is above a brightness threshold, and classifying the image as dark if the average pixel value is below the brightness threshold;

based on the classifying step, selecting, by the processor, a pre-set optimal brightness parameter;

calculating a next f-stop setting based on the current f-stop setting, the current brightness value and the optimal brightness value;

automatically adjusting, by an iris adjustment device, the imaging system's iris opening based on the calculated average value of pixels; and repeating steps from receiving the image at a memory through adjusting the iris until an algorithm stopping condition is met, wherein the algorithm stopping condition is a local convergence check.

12. The method of claim 11, wherein the step of calculating the next f-stop according to Equation 1:

$$F_{next} = F_{current} \cdot \sqrt{\frac{B_{current}}{B_{opt}}}$$

wherein $F_{next}$ is the next f-stop setting, $F_{current}$ is the current f-stop setting at which the image was captured, $B_{current}$ is the current average pixel value in the image and $B_{opt}$ is the optimal brightness value.

13. The method of claim 11, wherein the algorithm stopping condition is met when the next f-stop setting is substantially equal to the current f-stop setting.

\* \* \* \* \*